US012567932B2

(12) United States Patent
Li et al.

(10) Patent No.: US 12,567,932 B2
(45) Date of Patent: Mar. 3, 2026

(54) INTERFERENCE CONTROL METHOD AND APPARATUS

(71) Applicant: HUAWEI TECHNOLOGIES CO., LTD., Shenzhen (CN)

(72) Inventors: Shengyu Li, Beijing (CN); Lei Guan, Beijing (CN); Tong Su, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 440 days.

(21) Appl. No.: 18/175,069

(22) Filed: Feb. 27, 2023

(65) Prior Publication Data

US 2023/0216643 A1    Jul. 6, 2023

Related U.S. Application Data

(63) Continuation of application No. PCT/CN2020/111135, filed on Aug. 25, 2020.

(51) Int. Cl.
| | |
|---|---|
| *H04L 5/00* | (2006.01) |
| *H04W 72/0446* | (2023.01) |
| *H04W 72/0453* | (2023.01) |

(52) U.S. Cl.
CPC ....... *H04L 5/0051* (2013.01); *H04W 72/0446* (2013.01); *H04W 72/0453* (2013.01)

(58) Field of Classification Search
CPC ... H04L 5/0051; H04L 5/0048; H04L 5/0073; H04L 5/0094; H04L 25/0224; H04W 72/0446; H04W 72/0453; H04B 7/0421; H04B 7/0617; H04B 7/0404; H04J 11/005; Y02D 30/70
See application file for complete search history.

(56) References Cited

U.S. PATENT DOCUMENTS

| | | | | |
|---|---|---|---|---|
| 2016/0249245 A1* | 8/2016 | Kim | ...................... | H04W 72/21 |
| 2019/0098615 A1* | 3/2019 | Wang | ................... | H04L 5/0073 |

FOREIGN PATENT DOCUMENTS

| | | | |
|---|---|---|---|
| CN | 103987062 A | 8/2014 | |
| CN | 108024363 A | 5/2018 | |
| CN | 108964856 A | 12/2018 | |
| CN | 110637494 A | 12/2019 | |
| EP | 3633901 A1 | 4/2020 | |
| EP | 3633901 B1 * | 2/2023 | ............. H04L 5/001 |

OTHER PUBLICATIONS

Extended European Search Report issued in corresponding European Application No. 20950604.7, dated Aug. 17, 2023, pp. 1-11.
Samsung, Cross-link interference management based on coordinated beamforming. 3GPP TSG RAN WG1 Meeting #90, Prague, Czech Republic, Aug. 21-25, 2017, R1-1714505, 11 pages.

* cited by examiner

*Primary Examiner* — Chae S Lee
(74) *Attorney, Agent, or Firm* — HAUPTMAN HAM, LLP

(57) ABSTRACT

In an interference control method, a first network device sends first indication information to a first terminal device, where the first indication information indicates a first reference signal (RS). The first terminal device obtains, based on measurement on the first RS, first interference information corresponding to the first RS, determines a first transmission parameter based on the first interference information, and sends uplink information to the first network device on a first time-frequency resource based on the first transmission parameter.

16 Claims, 7 Drawing Sheets

S501: Determine a null space of a first subspace, where the first subspace is a subspace including L strongest interference directions on a first interference channel S502: Determine an original precoding matrix for first uplink transmission S503: Determine a projection of the original precoding matrix in the first subspace as a first precoding matrix

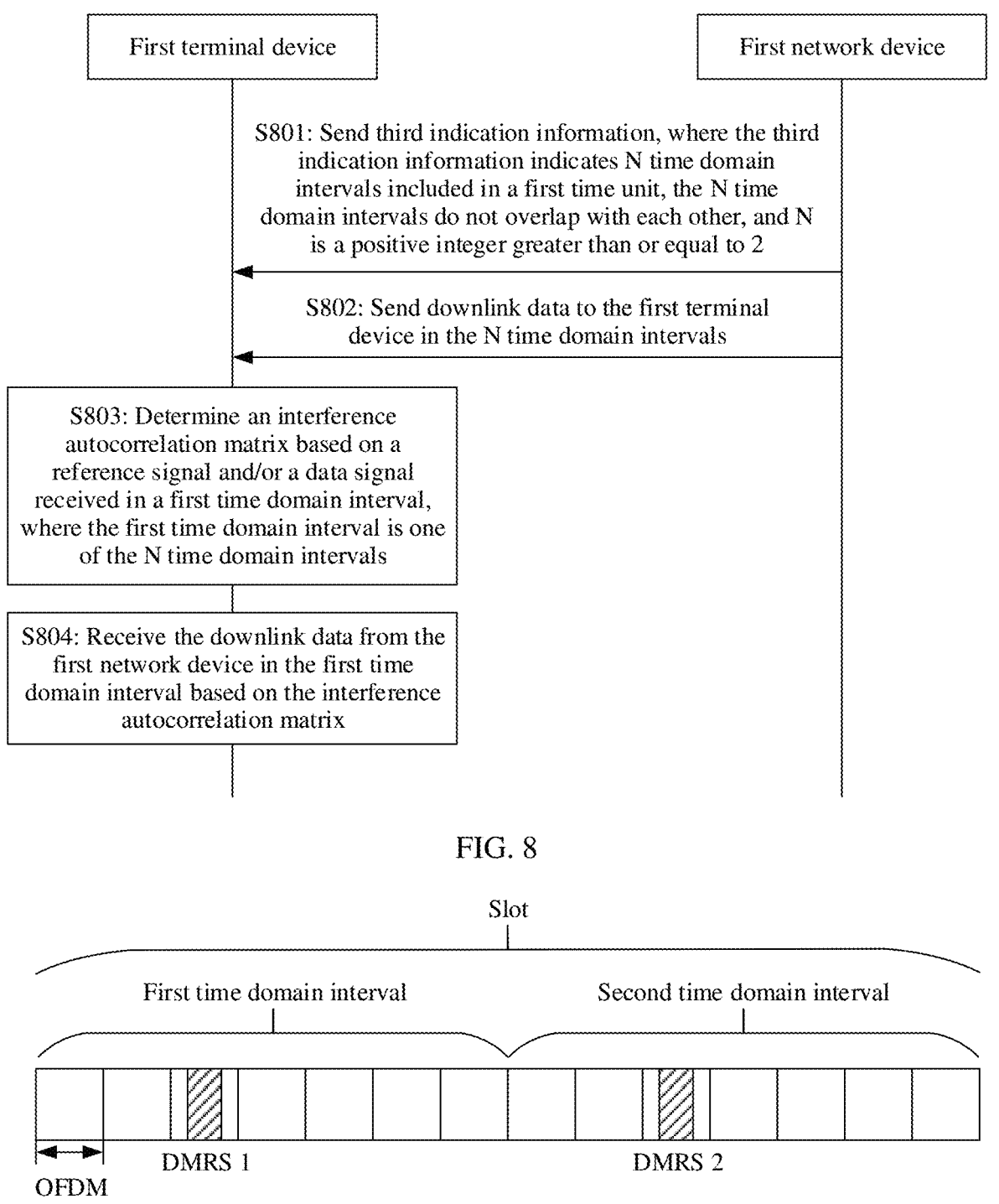

First terminal device

First network device

S801: Send third indication information, where the third indication information indicates N time domain intervals included in a first time unit, the N time domain intervals do not overlap with each other, and N is a positive integer greater than or equal to 2

S802: Send downlink data to the first terminal device in the N time domain intervals S803: Determine an interference autocorrelation matrix based on a reference signal and/or a data signal received in a first time domain interval, where the first time domain interval is one of the N time domain intervals S804: Receive the downlink data from the first network device in the first time domain interval based on the interference autocorrelation matrix

FIG. 8

Slot

First time domain interval

Second time domain interval

DMRS 1

DMRS 2

OFDM symbol

FIG. 9a

INTERFERENCE CONTROL METHOD AND APPARATUS

CROSS-REFERENCE TO RELATED APPLICATIONS

This application is a continuation of International Application No. PCT/CN2020/111135, filed on Aug. 25, 2020, the disclosure of which is hereby incorporated by reference in its entirety.

TECHNICAL FIELD

This application relates to the field of wireless communication technologies, and in particular, to an interference control method and an apparatus.

BACKGROUND

Compared with previous generations of mobile communication systems, a 5th generation (5G) mobile communication system imposes higher requirements on a transmission rate, a latency, and power consumption, and is dedicated to supporting higher system performance, a plurality of service types, different deployment scenarios, and a wider spectrum range Enhanced mobile broadband (eMBB), massive machine-type communications (mMTC), and ultra-reliable low-latency communication (URLLC) are three typical service scenarios in the 5G communication system.

In the 5G communication system, different base stations can be deployed in different areas, and different frame structures can be used to serve different services. FIG. 1 is a schematic diagram of several current possible frame structures. As shown in FIG. 1, a frame structure 1 is applicable to a downlink large-capacity service, a frame structure 2 is applicable to an uplink large-capacity service, and a frame structure 3 is applicable to a URLLC service.

Further, to improve spectrum resource utilization efficiency, the 5G communication system allows different services to use a same spectrum resource. However, due to different frame structures, when spectrum resources used by different services overlap, contradirectional interference exists in an overlapping area. As shown in FIG. 2, a transmission reception point (TRP) 1 and user equipment (UE) 1 support an uplink large-capacity service, and use a frame structure 2. A TRP 2 and UE 2 support a URLLC service, and use a frame structure 3. Because used frame structures are different, on an overlapping time-frequency resource, when the UE 1 sends uplink data, interference is caused to receiving of downlink data by the UE 2. Similarly, when the TRP 2 sends downlink data, interference is also caused to receiving of uplink data by the TRP 1.

SUMMARY

This application provides an interference control method and an apparatus, to resolve a problem of interference between terminal devices that support different services.

According to a first aspect, at least one embodiment of this application provides an interference control method. The method may be performed by a first terminal device, or may be performed by a component (for example, a chip or a circuit) configured in the first terminal device. In the following descriptions of this application, an example in which the first terminal device performs the method is used for description.

The method includes: A first terminal device receives first indication information from a first network device, where the first indication information indicates a first reference signal RS; the first terminal device obtains, based on measurement on the first RS, first interference information corresponding to the first RS; the first terminal device determines a first transmission parameter based on the first interference information; and the first terminal device sends uplink information to the first network device on a first time-frequency resource based on the first transmission parameter.

In the foregoing solution, the first network device may implicitly notify, by indicating the first RS, the first terminal device of an adjacent device that occupies a same time-frequency resource as the first terminal device to perform signal transmission, so that the first terminal device may determine an interference channel based on a measurement result of the first RS, and properly adjust a transmission parameter used when the first terminal device sends a signal, to avoid energy radiation in a direction of the interference channel and reduce interference to the adjacent device.

In a possible design of the first aspect, the first RS is an RS corresponding to a second terminal device that performs signal transmission on the first time-frequency resource.

In a possible design of the first aspect, the first transmission parameter includes a first precoding matrix, a projection of the first precoding matrix in a first subspace is 0, the first subspace is a subspace including L strongest characteristic directions on a first interference channel, the first interference channel is determined by using the first interference information, and L is a positive integer. For example, the first interference channel is a transmission channel or transposition of the transmission channel obtained through measurement based on the first RS.

In a possible design of the first aspect, L is equal to a quantity of eigenvalues whose values are greater than or equal to a first threshold in all eigenvalues of the first interference channel, in other words, L is equal to a quantity of characteristic directions whose corresponding eigenvalues are greater than the first threshold in all characteristic directions of the first interference channel, where the first threshold may be predefined in a protocol or preconfigured by the network device; or L is equal to 1, 2, S/2, or S–R, where S is a quantity of transmit antennas of the first terminal device, and R is a quantity of data layers when the first terminal device sends the uplink information.

In a possible design of the first aspect, the method further includes: The first terminal device receives first configuration information from the first network device, where the first configuration information indicates M RSs, the first RS is one of the M RSs, and M is a positive integer; and the first terminal device measures at least one of the M RSs, to obtain an interference channel corresponding to each of the at least one RS.

In a possible design of the first aspect, the first configuration information further indicates the time-frequency resource on which the first RS is located and a sending sequence of the first RS. The method further includes: The first terminal device determines the first interfering channel based on the sending sequence of the first RS and a signal received on the time-frequency resource.

In a possible design of the first aspect, the first RS is a channel sounding signal SRS or a channel state information-reference signal CSI-RS.

In a possible design of the first aspect, the uplink information includes one or more of the following information: uplink data information, uplink control information, and an SRS.

According to a second aspect, this application provides an interference control method. The method may be performed by a first network device or may be performed by a component (for example, a chip or a circuit) configured in the first network device. In the following descriptions of this application, an example in which the first network device performs the method is used for description.

The method includes: A first network device sends first indication information to a first terminal device, where the first indication information indicates a first reference signal RS, and the first RS is an RS corresponding to a second terminal device that performs signal transmission on a first time-frequency resource; and the first network device receives uplink information from the first terminal device on the first time-frequency resource.

In the foregoing solution, the first network device implicitly notifies, by indicating the first RS, the first terminal device of an adjacent device that occupies a same time-frequency resource as the first terminal device to perform signal transmission. In this way, the first terminal device may determine an interference channel based on a measurement result of the first RS, and properly adjust a transmission parameter used when the first terminal device sends a signal, to avoid energy radiation in a direction of the interference channel and reduce interference to the adjacent device.

In a possible design of the second aspect, the method further includes: The first network device obtains resource allocation information of a second network device; and the first network device determines the first RS based on the resource allocation information.

In a possible design of the second aspect, that the first network device determines the first RS based on the resource allocation information may include: The first network device determines, based on the resource allocation information, the second terminal device that performs signal transmission on the first time-frequency resource; and the first network device determines the first RS based on an identifier of the second terminal device, where the first RS is associated with the second terminal device.

In a possible design of the second aspect, the method further includes: The first network device sends first configuration information to the first terminal device, where the first configuration information indicates M RSs, the first RS is one of the M RSs, and M is a positive integer.

In a possible design of the second aspect, the first configuration information further indicates the time-frequency resource on which the first RS is located and a sending sequence of the first RS.

In a possible design of the second aspect, the first RS is a channel sounding signal SRS or a channel state information-reference signal CSI-RS.

In a possible design of the second aspect, the uplink information includes one or more of the following information: uplink data information, uplink control information, and an SRS.

According to a third aspect, at least one embodiment of this application provides an interference control method. The method may be performed by a first terminal device, or may be performed by a component (for example, a chip or a circuit) configured in the first terminal device. In the following descriptions of this application, an example in which the first terminal device performs the method is used for description.

The method may include: A first terminal device receives third indication information from a first network device, where the third indication information indicates N time domain intervals included in a first time unit, each of the N time domain intervals includes one or more consecutive symbols in time domain, different time domain intervals do not overlap each other in time domain, and N is a positive integer greater than or equal to 2; the first terminal device determines an interference autocorrelation matrix based on a reference signal and/or a data signal received in a first time domain interval, where the first time domain interval is one of the N time domain intervals; and the first terminal device receives downlink data from the first network device in the first time domain interval based on the interference autocorrelation matrix.

In the foregoing solution, the first network device indicates the N time domain intervals obtained by dividing the first time unit, and may implicitly notify the first terminal device that interference in the N time domain intervals needs to be independently measured. In this way, the first network device may flexibly indicate a division manner of the N time domain intervals based on a position of an adjacent interference device and a change of a transmission signal direction, to match an interference change, so that the first terminal device can better and more accurately measure the interference, to improve downlink signal transmission efficiency.

In a possible design of the third aspect, interference signals received by the first terminal device are different in different time domain intervals of the N time domain intervals.

In a possible design of the third aspect, the first time unit is a slot, a subframe, or a radio frame.

According to a fourth aspect, at least one embodiment of this application provides an interference control method. The method may be performed by a first network device, or may be performed by a component (for example, a chip or a circuit) configured in the first network device. In the following descriptions of this application, an example in which the first network device performs the method is used for description.

The method includes: A first network device sends third indication information to a first terminal device, where the third indication information indicates N time domain intervals included in a first time unit, each of the N time domain intervals includes one or more consecutive symbols in time domain, different time domain intervals do not overlap each other in time domain, and N is a positive integer greater than or equal to 2; and the first network device sends downlink data to the first terminal device in the N time domain intervals.

In the foregoing solution, the first network device indicates the N time domain intervals obtained by dividing the first time unit, and may implicitly notify the first terminal device that interference in the N time domain intervals needs to be independently measured. In this way, the first network device may flexibly indicate a division manner of the N time domain intervals based on a position of an adjacent interference device and a change of a transmission signal direction, to match an interference change, so that the first terminal device can better and more accurately measure the interference, to improve downlink signal transmission efficiency.

In a possible design of the fourth aspect, interference signals received by the first terminal device are different in different time domain intervals of the N time domain intervals.

In a possible design of the fourth aspect, the first time unit is a slot, a subframe, or a radio frame.

According to a fifth aspect, at least one embodiment of this application provides a communication apparatus. The apparatus may have a function of implementing the first terminal device according to any one of the first aspect or the possible designs of the first aspect, or have a function of implementing the first terminal device according to any one of the third aspect or the possible designs of the third aspect. The apparatus may be a terminal device, or may be a chip included in the terminal device.

The apparatus has a function of implementing the first network device according to any one of the second aspect or the possible designs of the second aspect, or has a function of implementing the first network device according to any one of the fourth aspect or the possible designs of the fourth aspect. The apparatus may be a network device, or may be a chip included in the network device.

The function of the communication apparatus may be implemented by hardware, or may be implemented by hardware executing corresponding software. The hardware or the software includes one or more modules, units, or means corresponding to the function.

In a possible design, a structure of the apparatus includes a processing module and a transceiver module. The processing module is configured to support the apparatus in performing a corresponding function of the first terminal device according to any one of the first aspect or the designs of the first aspect, a corresponding function of the first network device according to any one of the second aspect or the designs of the second aspect, a corresponding function of the first terminal device according to any one of the third aspect or the possible designs of the third aspect, or a corresponding function of the first network device according to any one of the fourth aspect or the possible designs of the fourth aspect. The transceiver module is configured to support communication between the apparatus and another communication device. For example, when the apparatus is a first terminal device, the apparatus may receive first indication information from the first network device. The communication apparatus may further include a storage module. The storage module is coupled to the processing module, and stores program instructions and data that are necessary for the apparatus. In an example, the processing module may be a processor, the transceiver module may be a transceiver, and the storage module may be a memory. The memory may be integrated with the processor, or may be disposed separately from the processor.

In another possible design, a structure of the apparatus includes a processor, and may further include a memory. The processor is coupled to the memory, and may be configured to execute computer program instructions stored in the memory, to enable the apparatus to perform the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect. Optionally, the apparatus further includes a communication interface, and the processor is coupled to the communication interface. When the apparatus is a network device or a terminal device, the communication interface may be a transceiver or an input/output interface. When the apparatus is a chip included in a network device or a terminal device, the communication interface may be an input/output interface of the chip. Optionally, the transceiver may be a transceiver circuit, and the input/output interface may be an input/output circuit.

According to a sixth aspect, at least one embodiment of this application provides a chip system, including a processor, where the processor is coupled to a memory, and the memory is configured to store a program or instructions. When the program or the instructions is/are executed by the processor, the chip system is enabled to implement the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect.

Optionally, the chip system further includes an interface circuit, and the interface circuit is configured to exchange code instructions with the processor.

Optionally, there may be one or more processors in the chip system, and the processor may be implemented by hardware or software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be disposed separately from the processor. For example, the memory may be a non-transitory processor, for example, a read-only memory ROM. The memory and the processor may be integrated into a same chip, or may be separately disposed on different chips.

According to a seventh aspect, at least one embodiment of this application provides a non-transitory computer-readable storage medium, storing a computer program or instructions. When the computer program or the instructions is/are executed, a computer is enabled to perform the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect.

According to an eighth aspect, at least one embodiment of this application provides a computer program product. When a computer reads and executes the computer program product, the computer is enabled to perform the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect.

According to a ninth aspect, at least one embodiment of this application provides a communication system. The communication system includes the network device and at least one terminal device in the foregoing aspects.

BRIEF DESCRIPTION OF DRAWINGS

FIG. 8 is a schematic flowchart of another interference control method according to at least one embodiment of this application;

FIG. 9A and FIG. 9B are two specific examples of another interference control method according to at least one embodiment of this application;

DESCRIPTION OF EMBODIMENTS

To make the objectives, technical solutions, and advantages of embodiments of this application clearer, the following further describes embodiments of this application in detail with reference to the accompanying drawings.

Technical solutions in embodiments of this application may be applied to various communication systems, for example, a long term evolution (LTE) system, an LTE frequency division duplex (FDD) system, an LTE time division duplex (TDD) system, a 5G mobile communication system or a new radio (NR) system, a future communication system, or another similar communication system.

Figure 3:
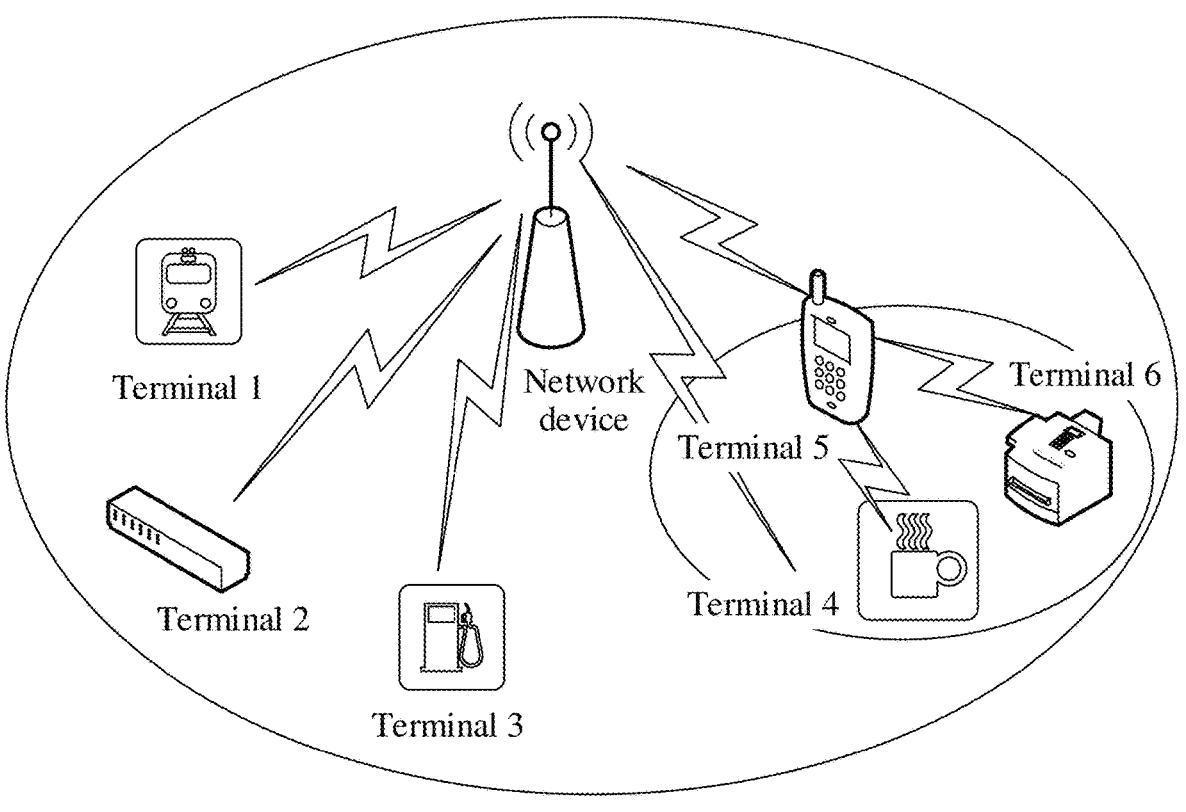
FIG. 3 is a schematic diagram of a structure of a communication system to which embodiments of this application are applicable.

FIG. 3 is a schematic diagram of a structure of a communication system according to at least one embodiment of this application. The communication system includes a network device and at least one terminal device (for example, terminals 1 to 6 shown in FIG. 3). The network device may communicate with the at least one terminal device (for example, the terminal device 1) through an uplink (UL) and a downlink (DL).

It should be noted that FIG. 3 is merely a schematic diagram. The communication system may further include another network device, for example, may further include a core network device, a wireless relay device, and a wireless backhaul device, which are not drawn in FIG. 3. Quantities of network devices, terminal devices, core network devices, wireless relay devices, and wireless backhaul devices included in the communication system are not limited in embodiments of this application.

The network device is also referred to as a radio access network device, and is a device that is in a network and that is configured to connect the terminal device to a wireless network. The network device may be a node in a radio access network, and may also be referred to as a base station, or may be referred to as a radio access network (RAN) node (or device). The network device may be an evolved NodeB (eNodeB) in an LTE system or an LTE-advanced (LTE-A) system; or may be a next generation NodeB (gNodeB) in a 5G NR system, or may be a TRP, a baseband unit (BBU) or a wireless fidelity (Wi-Fi) access point (AP), an integrated access and backhaul (IAB) node, or the like; or may be a central unit (CU) and/or a distributed unit (DU). This is not limited in embodiments of this application.

In a network structure, the network device may be a CU node, a DU node, or an access network device including a CU node and a DU node. Specifically, the CU node is configured to support protocols such as radio resource control (RRC), the packet data convergence protocol (PDCP), and the service data adaptation protocol (SDAP). The DU node is configured to support a radio link control (RLC) layer protocol, a medium access control (MAC) layer protocol, and a physical layer protocol.

The terminal device is a device that has wireless sending and receiving functions. The terminal device may communicate with a core network over a RAN, and exchange a voice and/or data with the RAN. The terminal device may be a mobile phone, a tablet computer, a computer having wireless sending and receiving functions, a mobile internet device, a wearable device, a virtual reality terminal device, an augmented reality terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in embodiments of this application. The terminal device sometimes may also be referred to as UE, a mobile station, a remote station, or the like.

By way of example and not limitation, in embodiments of this application, the terminal device may alternatively be a wearable device. The wearable device may also be referred to as a wearable intelligent device, an intelligent wearable device, or the like, and is a generic term for wearable devices that are intelligently designed and developed by applying wearable technologies to daily wear, such as glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

The terminal device may alternatively be a vehicle-mounted module, a vehicle-mounted component, a vehicle-mounted chip, or a vehicle-mounted unit that is built in a vehicle as one or more components or units. The vehicle may use the vehicle-mounted module, a vehicle-mounted module assembly, the vehicle-mounted component, the vehicle-mounted chip, or the vehicle-mounted unit that is built in the vehicle to implement the method in this application.

The terminal device may alternatively be a sensor device such as a smart printer, a train detector, or a gas station. Specific technologies, specific device forms, and names used by the network device and the terminal device are not limited in the embodiments of this application.

The network device and the terminal device may be deployed on land, where the deployment includes indoor or outdoor, or handheld or vehicle-mounted deployment; may be deployed on water (for example, on a ship); may be deployed in air (for example, on an airplane, a balloon, and a satellite); or the like. An application scenario of the network device and the terminal device is not limited in embodiments of this application.

The network device and the terminal device may communicate with each other by using a licensed spectrum, may communicate with each other by using an unlicensed spectrum, or may communicate with each other by using both a licensed spectrum and an unlicensed spectrum. The network device and the terminal device may communicate with each other by using a spectrum below 6 gigahertz (GHz), may communicate with each other by using a spectrum above 6 GHz, or may communicate with each other by using both a spectrum below 6 GHz and a spectrum above 6 GHz. A spectrum resource used between the network device and the terminal device is not limited in embodiments of this application.

It should be noted that a system architecture and a service scenario described in embodiments of this application are intended to describe the technical solutions in embodiments of this application more clearly, and do not constitute any limitation on the technical solutions provided in embodiments of this application. A person of ordinary skill in the art may know that, with evolution of a network architecture and emergence of a new service scenario, the technical solutions provided in embodiments of this application are also applicable to a similar technical problem.

The terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of descriptions such as "at least one type" is similar. The term "and/or" describes an association relationship between associated objects and indicates that three relationships may exist. For example, A and/or B may indicate the following three cases: Only A exists, both A and B exist, and only B exists. In addition, the character "/" generally indicates an "or" relationship between the associated objects.

Unless otherwise stated, ordinal numbers such as "first" and "second" in embodiments of this application are used to distinguish between a plurality of objects, but are not intended to limit a sequence, a time sequence, priorities, or importance of the plurality of objects. In addition, descriptions of "first" and "second" do not necessarily indicate that objects are different.

Figures 4, 5:
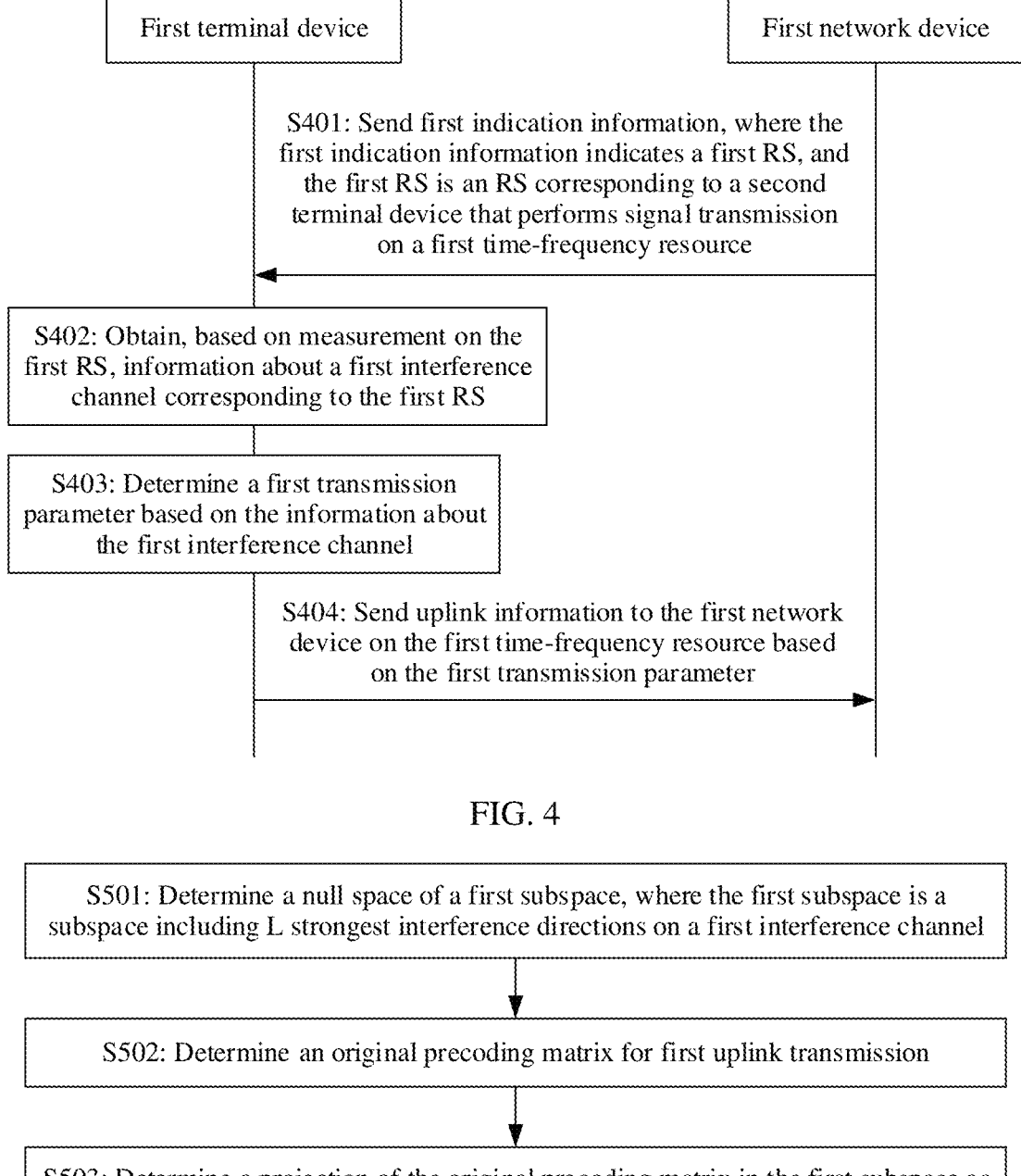
FIG. 4 is a schematic flowchart of an interference control method according to at least one embodiment of this application.
FIG. 5 is a schematic flowchart in which a first terminal device determines a first precoding matrix according to at least one embodiment of this application.

FIG. 4 is a schematic flowchart of an interference control method according to at least one embodiment of this application. The method includes the following steps.

Step S401: A first network device sends first indication information to a first terminal device, where the first indication information indicates a first reference signal (RS). Optionally, the first RS is an RS corresponding to a second terminal device that performs signal transmission on a first time-frequency resource.

Correspondingly, the first terminal device may receive the first indication information from the first network device.

In at least one embodiment of this application, the first network device is a serving network device of the first terminal device, or may be referred to as a serving base station or a serving node. To be specific, the first terminal device accesses the first network device, and the first network device provides control and data services for the first terminal device.

The first time-frequency resource is a time-frequency resource that is allocated by the first network device to the first terminal device by using signaling and that is used for uplink transmission. The first terminal device may send uplink information to the first network device on the first time-frequency resource. The uplink information may include one or more of uplink data information, uplink control information, or a sounding reference signal (SRS). The uplink data information may be carried on a physical uplink shared channel (PUSCH), and the uplink control information may be carried on a physical uplink control channel (PUCCH).

In at least one embodiment of this application, the signaling may be higher layer signaling or physical layer signaling. The higher layer signaling may be RRC signaling or a media access control control element (MAC CE). The physical layer signaling may be downlink control information (DCI) carried on a physical downlink control channel (PDCCH).

If a transmission process in which the first terminal device sends the uplink information to the first network device on the first time-frequency resource is denoted as first uplink transmission, the first uplink transmission may be uplink transmission dynamically scheduled or triggered by the first network device by using DCI, for example, may be a dynamically scheduled PUSCH, a dynamically triggered PUCCH, or an aperiodic SRS. Alternatively, the first uplink transmission may be uplink transmission configured by the first network device, for example, may be a configured grant PUSCH, or a configured periodic or semi-persistent PUCCH or SRS.

Before the first network device sends the first indication information to the first terminal device, the first network device may exchange information with an adjacent second network device to determine the first RS. Specifically, the first network device may obtain resource allocation information of the second network device, determine, based on the resource allocation information, the second terminal device that is scheduled by the second network device and that performs signal transmission on the first time-frequency resource, and then determine, based on an identifier of the second terminal device, the RS corresponding to the second terminal device as the first RS. Further, the first network device may indicate the first RS to the first terminal device by using the first indication information. Optionally, that the first indication information indicates the first RS may be that the first indication information directly indicates an identifier (ID) of the first RS.

It should be noted that a specific device form of the second terminal device is not limited in embodiments of this application. The second terminal device may be considered as a terminal device, a network device, or another type of device, such as a relay device, that is managed by the second network device and for which the second network device is responsible for scheduling the first time-frequency resource for signal transmission. For ease of description, the terminal device, the network device, or the another type of device is collectively referred to as the second terminal device in at least one embodiment of this application. It should be understood that, the second terminal device in at least one embodiment of this application is merely a representative of a terminal device, a network device, or another type of device that performs signal transmission on the first time-frequency resource.

Before the first network device sends the first indication information to the first terminal device, the first network device may coordinate with the adjacent second network device, to determine RS information associated with each of different adjacent devices (including the second terminal device), for example, an RS ID and time-frequency resource information. For example, the first network device and the adjacent second network device determine M RSs in coordination, and each RS corresponds to one adjacent terminal device. In other words, each terminal device A served by the second network device sends, on a preset time-frequency resource, an RS associated with the terminal device A. In this way, a terminal device B served by the first network device may obtain, through measurement, all interference channels from the terminal device A to the terminal device B, so that the terminal device B performs interference avoidance during subsequent uplink transmission.

If the second terminal device is specifically a terminal device that performs signal transmission on the first time-frequency resource the same as that used by the first terminal device, the second terminal device may access the second network device, and the second network device provides control and data services for the second terminal device. For example, the second network device may control the second terminal device to receive downlink information on the first time-frequency resource. The downlink information may include one or more of downlink data information, downlink control information, or a channel state information-reference signal (CSI-RS). The downlink data information may be carried on a physical downlink shared channel (PDSCH), and the downlink control information may be carried on a PDCCH. It may be understood that, in embodiments of this application, the PUSCH, the PUCCH, the PDSCH, and the PDCCH are merely used as examples of an uplink data channel, an uplink control channel, a downlink data channel, and a downlink control channel. In different communication systems, the channels may have different names. This is not limited in embodiments of this application.

It can be learned from the foregoing descriptions that, because the first terminal device and the second terminal device occupy the same time-frequency resource, when the first terminal device sends uplink information on the first time-frequency resource, interference may be caused to receiving of downlink information from the second network device by the second terminal device.

The first indication information may be sent by the network device by using higher layer signaling or physical layer signaling.

In a possible implementation, if the first uplink transmission is uplink transmission dynamically scheduled or triggered by the first network device by using first DCI, the first indication information may be included in the first DCI and sent to the first terminal device. To be specific, when the first DCI is used to schedule or trigger the first uplink transmission, the first DCI further indicates the first RS. For example, the first DCI may include the identifier of the first RS.

In another possible implementation, if the first uplink transmission is uplink transmission configured by the first network device, the first indication information may be included in a configuration parameter of the first uplink transmission and sent to the first terminal device. To be specific, the configuration parameter of the first uplink transmission is used to configure the first uplink transmission, and further indicates the first RS. For example, the configuration parameter of the first uplink transmission may include the identifier of the first RS.

In still another possible implementation, the first indication information may alternatively be included in separate second DCI or higher layer signaling and sent to the first terminal device. The first terminal device may determine, according to a predefined rule or network indication rule, an uplink transmission set to which the first indication information is applied. The first uplink transmission is one uplink transmission in the uplink transmission set. For example, the first indication information is included in the second DCI, the second DCI may include the identifier of the first RS, and the second DCI is DCI that is separately sent, rather than DCI used to schedule the first uplink transmission. It is assumed that a sending moment of the second DCI is T1, an uplink transmission set to which the second DCI is applied may include all uplink transmissions whose start moments, end moments, or entire time domain positions are in a first time window. The first time window is determined based on the sending moment T1, and the first time window may be considered as a time domain resource set to which the first RS is applicable. For another example, the first indication information is included in the higher layer signaling, and indicates a first RS set including the first RS and a time-frequency resource set corresponding to each RS in the first RS set. Optionally, a time-frequency resource set corresponding to one RS may include a time-frequency resource A and all time domain resources obtained after the time-frequency resource A is periodically translated in time domain. Correspondingly, after receiving the first indication information, the first terminal device determines the first RS based on the first time-frequency resource.

Step S402: The first terminal device obtains, based on measurement on the first RS, first interference information corresponding to the first RS.

As described above, the first RS is the RS corresponding to the second terminal device that performs signal transmission on the first time-frequency resource. In at least one embodiment of this application, the second terminal device may send the first RS. Correspondingly, after receiving the first indication information indicating the first RS, the first terminal device may determine the time-frequency resource on which the first RS is located and/or a sending sequence of the first RS, and then receive the first RS. By measuring the first RS, the first terminal device may obtain the first interference information corresponding to the first RS. The first interference information may be information about an interference channel corresponding to the first RS. The interference channel corresponding to the first RS is a transmission channel between the first terminal device and the second terminal device, or more accurately, a transmission channel from the second terminal device to the first terminal device.

Optionally, the first RS may be a non zero power-reference signal (NZP-RS) or a zero power-reference signal (ZP-RS). If the first RS is an NZP-RS, the second terminal device may send the RS on a time-frequency resource corresponding to the RS, and the first terminal device performs channel estimation based on a signal received on the time-frequency resource on which the RS is located and a sending sequence of the RS, to obtain information about a corresponding interference channel. If the first RS is a ZP-RS, the second terminal device may send a data signal or a reference signal on a time-frequency resource corresponding to the RS, and the first terminal device estimates an interference channel based on a signal received on the time-frequency resource on which the RS is located, to obtain information about the corresponding interference channel; or the first terminal device may calculate an interference autocorrelation matrix based on a signal received on the time-frequency resource on which the RS is located, and calculate an interference channel based on the interference autocorrelation matrix, obtain information about the corresponding interference channel For example, the first terminal device may calculate, for each resource element (RE) on the time-frequency resource on which the RS is located, a product of a received signal vector and conjugate transposition of the received signal vector to obtain a received signal matrix, perform filtering smoothing or linear averaging on received signal matrices on a plurality of adjacent REs to obtain a corresponding interference autocorrelation matrix, and finally perform singular value decomposition on the autocorrelation matrix to obtain a singular vector, namely, the following characteristic direction of the interference channel, and the root of the singular value is the following eigenvalue of the interference channel Optionally, the first RS may be an SRS or a CSI-RS.

Optionally, the first RS may be a periodically sent RS. In this way, the first terminal device may obtain, based on latest measurement on the first RS, the first interference information corresponding to the first RS; or the first terminal device may obtain, based on all measurement on the first RS, the first interference information corresponding to the first RS.

In a possible implementation, in consideration of a case in which specific processing duration is required for the first terminal device to obtain, by measuring the first RS, the first interference information corresponding to the first RS in the current measurement, the first terminal device may obtain, based on latest measurement on the first RS before a first time point, the first interference information corresponding to the first RS; or the first terminal device may obtain, based on all measurement on the first RS before the first time point, the first interference information corresponding to the first RS; or the first terminal device may obtain, based on some measurement results of all measurement on the first RS before a first time point, the first interference information corresponding to the first RS. The first time point is determined based on a time domain position of the first uplink transmission. For example, the first time point may be a time domain position obtained by subtracting preset duration from a time domain start position of the first time-frequency resource. The preset duration may be predefined or configured by a network for the first terminal device, or may be set by the first terminal device based on a processing capability of the first terminal device. This is not limited in this application.

Step S403: The first terminal device determines a first transmission parameter based on the first interference information.

Step S404: The first terminal device sends uplink information to the first network device on the first time-frequency resource based on the first transmission parameter. Correspondingly, the first network device may receive the uplink information from the first terminal device on the first time-frequency resource.

In at least one embodiment of this application, the first transmission parameter may include at least one of the following: a space domain configuration parameter and a transmit power. The space domain configuration parameter may include a precoding matrix and transmission beam information. The precoding matrix represents a space domain processing behavior during the first uplink transmission. The transmission beam information may also be referred to as analog/digital beam information or a transmission space domain filtering setting, and indicates a direction of a transmission beam, phase values of phase shifters connected to different antenna elements in a transmit antenna array, or the like. The transmission power is a parameter such as an output power or power spectral density of a signal sent by the terminal device.

In a possible implementation, the first transmission parameter may be a first precoding matrix, and the first precoding matrix is a precoding matrix used when the first terminal device performs the first uplink transmission, or is a precoding matrix used when the first terminal device precodes the uplink information. In this way, after determining the first precoding matrix, the first terminal device may send the uplink information on the first time-frequency resource by using the first precoding matrix.

Specifically, a projection of the first precoding matrix in a first subspace is 0, the first subspace is a subspace including L strongest characteristic directions in a first interference channel matrix, where L is a positive integer. The first interference channel matrix is determined by using the first interference information. For example, the first interference channel matrix may be a matrix of a transmission channel or a transposition matrix of the transmission channel that is obtained through measurement based on the first RS. That the projection of the first precoding matrix in the first subspace is 0 may also be understood as that a product of the L strongest characteristic directions in the first interference channel matrix and the first precoding matrix is a zero matrix, or the L strongest characteristic directions in the first interference channel matrix are orthogonal to a characteristic direction of the first precoding matrix.

Optionally, the first terminal device determines the first interference channel matrix based on a correspondence between a transceiver antenna array, a transmit antenna port, and a receive antenna port. For example, when the first terminal device has four transceiver antennas, four transmit antenna ports, and four receive antenna ports, and the four transceiver antennas correspond one-to-one to the four transmit antenna ports and the four receive antenna ports, the first terminal device obtains a receiving interference channel matrix through measurement based on the first RS, and the receiving interference channel matrix or a transposition matrix of the receiving interference channel matrix is the first interference channel matrix. For another example, when the first terminal device has four transceiver antennas, two transmit antenna ports, and four receive antenna ports, the four transceiver antennas correspond one-to-one to the four receive antenna ports, and the first antenna and the third antenna correspond one-to-one to the two transmit antenna ports, the first terminal device obtains a receiving interference channel matrix through measurement based on the first RS, and a matrix including the first column and the third column of the receiving interference channel matrix or a transposition matrix of the receiving interference channel matrix is the first interference channel matrix.

L may be equal to a quantity of eigenvalues whose values are greater than or equal to a first threshold in all eigenvalues of the first interference channel matrix, namely, a quantity of characteristic directions whose corresponding eigenvalues in all characteristic directions of the first interference channel matrix obtained by the first terminal device through measurement are greater than or equal to the first threshold. The first threshold may be predefined, preconfigured, or dynamically indicated by the first network device to the first terminal device. This is not limited in this application. Alternatively, L may be equal to 1, 2, or S/2, and S is a quantity of transceiver antennas of the first terminal device. Alternatively, L may be equal to S–R, where S is a quantity of transceiver antennas of the first terminal device, R is a quantity of data layers when the first terminal device sends the uplink information, and is also a quantity of columns in the first precoding matrix. The quantity of data layers may also be referred to as a quantity of data streams or a quantity of demodulation reference signal (DMRS) ports. This is not limited in this application. For example, if the first uplink transmission is PUSCH transmission (to be specific, the uplink information is uplink data information), R may be a quantity of DMRS ports in the PUSCH transmission; if the first uplink transmission is PUCCH transmission (to be specific, the uplink information is uplink control information), R may be a quantity of DMRS ports in the PUCCH transmission; or if the first uplink transmission is SRS transmission, R may be a quantity of ports in the SRS transmission. Alternatively, L may be predefined or preconfigured, or may be dynamically indicated by the first network device. This is not limited in this application.

For example, that the first terminal device determines the first precoding matrix based on the first interference information may include the following step S501 to step S503.

Step S501: The first terminal device determines a null space of the first subspace.

First, the first terminal device determines, based on the first interference information, the subspace including the L strongest characteristic directions in the first interference channel matrix, namely, the first subspace. The first subspace is a subspace of a vector space including S*1-dimensional complex vectors, and S is the quantity of transceiver antennas of the first terminal device. Any vector in the first subspace may be represented as a linear combination of the L strongest eigenvectors of the first interference channel matrix; in other words, the linear combination of the L strongest characteristic directions in the first interference channel matrix is included in the first subspace.

Then, the first terminal device may determine an orthogonal space of the first subspace as the null space of the first subspace. The null space of the first subspace is another subspace of the vector space including the S*1-dimensional complex vectors, and may be denoted as a second subspace. Any vector in the null space of the first subspace is orthogonal to any vector in the first subspace; in other words, vectors orthogonal to all the vectors in the first subspace are included in the null space of the first subspace.

Step S502: The first terminal device determines an original precoding matrix for the first uplink transmission.

The original precoding matrix is a precoding matrix that is prepared by the first terminal device to be applied to the first uplink transmission before the first terminal device performs beam adjustment. The original precoding matrix includes R precoding vectors, where R is the quantity of data layers used when the first terminal device sends the uplink information.

Specifically, in a possible implementation, if the first uplink transmission is the uplink transmission scheduled by the first network device by using the first DCI, the original precoding matrix may be dynamically indicated by the first DCI. For example, when the first uplink transmission is a dynamically scheduled PUSCH, the original precoding matrix may be determined based on a precoding matrix indicator (PMI) or an SRS resource indicator (SRI) in the first DCI. If the first uplink transmission is granted uplink transmission configured by the first network device, the original precoding matrix may be indicated by a higher-layer parameter corresponding to the first uplink transmission. For example, when the first uplink transmission is a configured grant PUSCH, the original precoding matrix may be determined based on a PMI or an SRI in a higher-layer configuration parameter of the configured grant PUSCH. If the first uplink transmission is a periodic SRS or PUCCH configured by the first network device, the original precoding matrix may be determined by using a second RS associated with a higher-layer configuration parameter of the periodic SRS or PUCCH. The second RS is used to determine a space domain setting of the SRS or the PUCCH, namely, information such as a transmit precoding matrix or an analog beam in space domain.

Alternatively, in another possible implementation, the original precoding matrix may be any precoding matrix determined by the first terminal device. This is not limited in this application.

Step S503: The first terminal device determines a projection of the original precoding matrix in the first subspace as the first precoding matrix.

In at least one embodiment of this application, the first precoding matrix also includes R precoding vectors. However, the R precoding vectors included in the first precoding matrix are projection vectors of the R precoding vectors in the original precoding matrix in the null space of the first subspace. To be specific, the first precoding matrix is a precoding matrix including the projection vectors of the R precoding vectors in the original precoding matrix in the null space of the first subspace.

Specifically, R=1 is used as an example. For one precoding vector in the original precoding matrix, if an inner product of a unit vector in the null space of the first subspace and the precoding vector is the largest, it indicates that the unit vector is a projection vector of the precoding vector in the null space of the first subspace.

In a possible implementation, after determining the first precoding matrix, the first terminal device may first send an SRS to the first network device by using the determined first precoding matrix. The SRS and the uplink information are different information or signals. Further, the first network device may receive the SRS, adjust a modulation and coding scheme (MCS) based on a measurement result of the SRS, and then send second indication information to the first terminal device, where the second indication information indicates an adjusted MCS. Correspondingly, after receiving the second indication information, the first terminal device may send the uplink information based on the adjusted MCS indicated by the second indication information.

In this way, channel quality for the first terminal device to send the uplink information by using the precoding matrix obtained after the original precoding matrix is adjusted can match the used MCS, so that a success rate of receiving the uplink information by the first network device is effectively improved.

Optionally, the first terminal device may also send the uplink information by using the determined first precoding matrix. Alternatively, the first network device may indicate, in the second indication information, a precoding matrix specifically used when the first terminal device sends the uplink information. The specifically used precoding matrix may be the same as or different from the first precoding matrix used when the first terminal device sends the SRS. This is not limited. In addition, the first network device may directly indicate, in the second indication information, information about the specifically used precoding matrix, or may indirectly indicate the information by using an SRI in the second indication information. In other words, the specifically used precoding matrix is a precoding matrix used when the terminal device sends an SRS indicated by the SRI.

Optionally, the first indication information may indicate a plurality of first RSs. In this case, the plurality of first RSs may correspond one-to-one to a plurality of frequency domain resources included in the first time-frequency resource. A unit of the frequency domain resource may be a resource block (RB), a sub-RB, or a subband. The sub-RB is P consecutive REs, where P<12. The subband is Q consecutive RBs, where Q≥2. For example, the frequency domain resource is a subband. The first indication information may indicate identifiers of a plurality of RSs and a subband set corresponding to each RS, or the first indication information may indicate a plurality of subbands and an identifier of an RS associated with each subband. Further, the first terminal device may measure, for each RS, a corresponding interference channel on a frequency domain resource corresponding to the RS, to obtain corresponding interference information, and then perform processing similar to that described in step S403 and step S404 for each interference channel/each piece of interference information, to determine a first transmission parameter on the frequency domain resource corresponding to the RS, so as to send, by using the first transmission parameter, the uplink information on the frequency domain resource corresponding to the RS.

Optionally, for one frequency domain resource, the first indication information may alternatively indicate a plurality of first RSs. In this case, the plurality of first RSs may correspond to a plurality of second terminal devices. For example, the frequency domain resource is a subband. In this case, the first terminal device may measure a corresponding interference channel for each RS, and aggregate the plurality of interference channels to obtain a final interference channel, namely, corresponding interference information. Finally, processing similar to that described in step S403 and step S404 is performed on the aggregated interference channel/interference information, to determine a first transmission parameter on the subband, and then send the uplink information on the subband by using the first transmission parameter. For example, for a subband A, the first RS includes an RS #A (and a corresponding time-frequency resource #A) and an RS #B (and a corresponding time-frequency resource #B). The first terminal device measures the RS #A on the time-frequency resource #A to obtain a receiving interference channel matrix #A (denoted as G1), and measures the RS #B on the time-frequency resource #B to obtain a receiving interference channel matrix #B (denoted as G2). In this case, a channel matrix G=[G1, G2] is obtained after the receiving interference channels matrices #A and #B are aggregated, where G1 and G2 are complex matrices in dimensions of S*L1 and S*L2, S is a quantity of receive antenna ports of the first terminal device, and L1 and L2 are quantities of interference flows obtained through measurement on the RS #A and the RS #B. Finally, the first interference channel matrix is obtained based on the aggregated channel matrix G, and a transmission parameter on the subband A is determined based on the first interference channel matrix.

Optionally, before the first network device sends the first indication information to the first terminal device, the first network device may further send first configuration information to the first terminal device, where the first configuration information indicates the M RSs. In other words, the first configuration information indicates an RS set, the RS set includes the M RSs, and M is a positive integer. Correspondingly, the first terminal device may receive the first configuration information from the first network device. Then, the first terminal device may determine, as indicated by the first configuration information, a time-frequency resource on which each of the M RSs is located and/or a sending sequence of each RS.

Specifically, in a possible implementation, that the first configuration information indicates the M RSs may be: The first configuration information includes identifiers of the M RSs, the identifier of each RS is associated with one piece of RS configuration information, and the RS configuration information indicates the time-frequency resource on which the corresponding RS is located and/or the sending sequence of the RS. It may be understood that in this implementation, it may be considered that the first configuration information indirectly indicates the time-frequency resource on which each of the M RSs is located and/or the sending sequence of the RS. In this way, the terminal device may obtain, based on the identifiers of the M RSs included in the first configuration information, the RS configuration information respectively associated with the M RSs, to determine, based on the RS configuration information respectively associated with the M RSs, the time-frequency resource on which each of the M RSs is located and/or the sending sequence of the RS.

It should be noted that, an association relationship between the identifier of each of the M RS s and the RS configuration information corresponding to the identifier of the RS may be predefined in a protocol, or may be preconfigured by the first network device for the first terminal device by using higher layer signaling, or may be indicated by the first network device to the first terminal device by using physical layer signaling, or may be obtained by the first terminal device in another manner. This is not limited in this application.

In another possible implementation, that the first configuration information indicates the M RSs may alternatively be: The first configuration information includes identifiers of the M RSs and RS configuration information associated with each of the M RSs, and the RS configuration information indicates the time-frequency resource on which the corresponding RS is located and/or the sending sequence of the RS. It may be understood that in this implementation, it may be considered that the first configuration information directly indicates the time-frequency resource on which each of the M RSs is located and/or the sending sequence of the RS. In this way, after receiving the first configuration information, the terminal device may directly determine, based on the first configuration information, the time-frequency resource on which each of the M RSs is located and/or the sending sequence of the RS.

Further, after determining the time-frequency resource on which each of the M RSs is located and/or the sending sequence of the RS, the first terminal device may measure at least one of the M RSs, to obtain interference information corresponding to each of the at least one RS, namely, information about an interference channel corresponding to each RS. Optionally, the first terminal device may measure each of the M RSs, to obtain interference information corresponding to each of the M RSs, namely, information about interference channels corresponding to the M RSs.

For example, for one of the M RSs, that the first terminal device measures the RS, and obtains the information about the interference channel corresponding to the RS may be specifically as follows: If the RS is an NZP-RS, and the first configuration information indicates a sending sequence of the RS (including a direct indication and an indirect indication), the first terminal device may perform channel estimation based on a signal received on a time-frequency resource on which the RS is located and the sending sequence of the RS, and then obtain the information about the interference channel corresponding to the RS. If the RS is a ZP-RS, to be specific, the first configuration information does not indicate a sending sequence of the RS, the first terminal device may estimate the interference channel based on a data signal or a reference signal received on a time-frequency resource occupied by the RS, to obtain the information about the interference channel corresponding to the RS. Alternatively, the first terminal device may calculate an interference autocorrelation matrix based on a data signal or a reference signal received on a time-frequency resource occupied by the RS, and then calculate the interference channel based on the interference autocorrelation matrix, to obtain the information about the interference channel corresponding to the RS.

Optionally, the time-frequency resource on which the RS is located may include a plurality of subbands in frequency domain, and the first terminal device may obtain information about a corresponding interference channel through measurement on each subband.

In at least one embodiment of this application, the M RSs may correspond one-to-one to M terminal devices. The first RS is one of the M RSs, and is specifically an RS corresponding to a second terminal device in the M terminal devices. The M terminal devices are terminal devices managed by one or more other network devices adjacent to the first network device. For specific device forms of the M terminal devices, refer to the foregoing descriptions of the second terminal device. Details are not described herein again.

It may be understood that the first configuration information may indicate the first RS. For example, the first configuration information may include the identifier of the first RS, the identifier of the first RS is associated with RS configuration information of the first RS, and the RS configuration information of the first RS indicates the time-frequency resource on which the first RS is located and/or the sending sequence of the first RS.

Alternatively, the first configuration information may indicate the first RS, and the time-frequency resource on which the first RS is located and/or the sending sequence of the first RS. For example, the first configuration information may include the identifier of the first RS and the RS configuration information of the first RS, and the RS configuration information of the first RS indicates the time-frequency resource on which the first RS is located and/or the sending sequence of the first RS.

It can be learned that in at least one embodiment of this application, when the first terminal device is to send the uplink information on the first time-frequency resource, the first network device may determine, based on a resource allocation status of the adjacent second network device, the second terminal device that occupies the same first time-frequency resource as the first terminal device, and indicate, to the first terminal device by using the first indication information, the first RS corresponding to the second terminal device. In this way, after receiving the first indication information, the first terminal device may measure the interference channel corresponding to the first RS, and actively adjust, based on the interference channel obtained through measurement, the transmission parameter when sending the uplink information, for example, adjust the precoding matrix, to avoid interference to the second terminal device that occupies the same time-frequency resource.

In uplink transmission in accordance with other approaches, a precoding matrix used when a terminal device sends uplink information usually points to a target network device. In other words, a characteristic direction of the precoding matrix is aligned with a characteristic direction of a channel from the terminal device to the target network device. However, in at least one embodiment of this application, the first network device may implicitly notify, by indicating the first RS, the first terminal device of the interference channel of the second terminal device that occupies the same time-frequency resource as the first terminal device. The first terminal device may perform, based on the original precoding matrix, interference zero-forcing on the interference channel indicated by the first network device, and correspondingly adjust the beam or the precoding matrix used when sending the uplink information, to avoid causing interference to the second terminal device.

Figure 6:
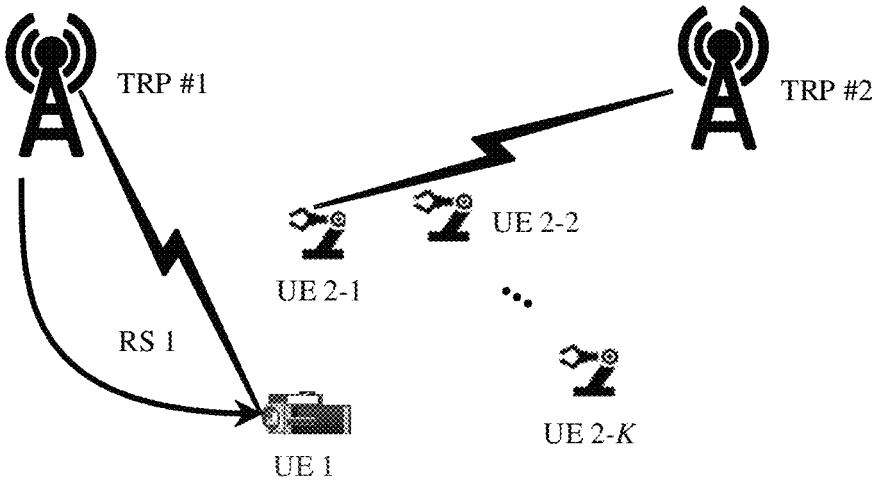
FIG. 6 is a schematic diagram of a scenario of a specific example of an interference control method according to at least one embodiment of this application.

For example, in FIG. 6, a TRP #1 is a network device that supports an eMBB service, and UE 1 is a terminal device that supports the eMBB service. The UE 1 accesses the TRP 1, and the TRP 1 provides control and data services for the UE 1. In an example, the UE 1 shown in FIG. 6 is a surveillance device that has a camera shooting function and a video uploading function. A TRP #2 is a network device that supports a URLLC service, and UE 2 (including UE 2-1 to UE 2-K shown in FIG. 6) is a terminal device that supports the URLLC service. In an example, the UE 2 shown in FIG. 6 is a mechanical arm applied to an industrial automation control scenario. In a specific application scenario, deployment of the UE 2 is characterized by high density. Therefore, a plurality of UEs 2 may be distributed around one UE 1, for example, the UE 2-1 to the UE 2-K shown in FIG. 6, where K is a positive integer.

It can be learned from service features of the UE 1 and the UE 2 that the UE 1 needs to send a photographed surveillance video to the TRP #1, and the UE 2 (the UE 2-1 to the UE 2-K shown in FIG. 6) needs to receive a real-time mechanical control instruction from the TRP #2. When the UE 1 uploads the surveillance video, to avoid interference caused to receiving of the mechanical control instruction by the UE 2, the TRP #1 may obtain scheduling information of the TRP #2 from the TRP #2, and determine, based on scheduling information of the TRP #2, that UE 2 that occupies a same time-frequency resource as the UE 1 to perform downlink transmission when the UE 1 performs uplink transmission is the UE 2-1. In this way, the TRP #1 may indicate an RS 1 corresponding to the UE 2-1 to the UE 1, so that the UE 1 measures the RS 1 to obtain information about a corresponding interference channel, and performs interference zero-forcing on the interference channel when sending uplink information. For example, the TRP #1 may adjust a precoding matrix or a beam direction used when sending the uplink information, to avoid interference to the UE 2-1.

Embodiments of this application further focus on another type of interference formed between terminal devices that support different services.

Figures 1, 2:
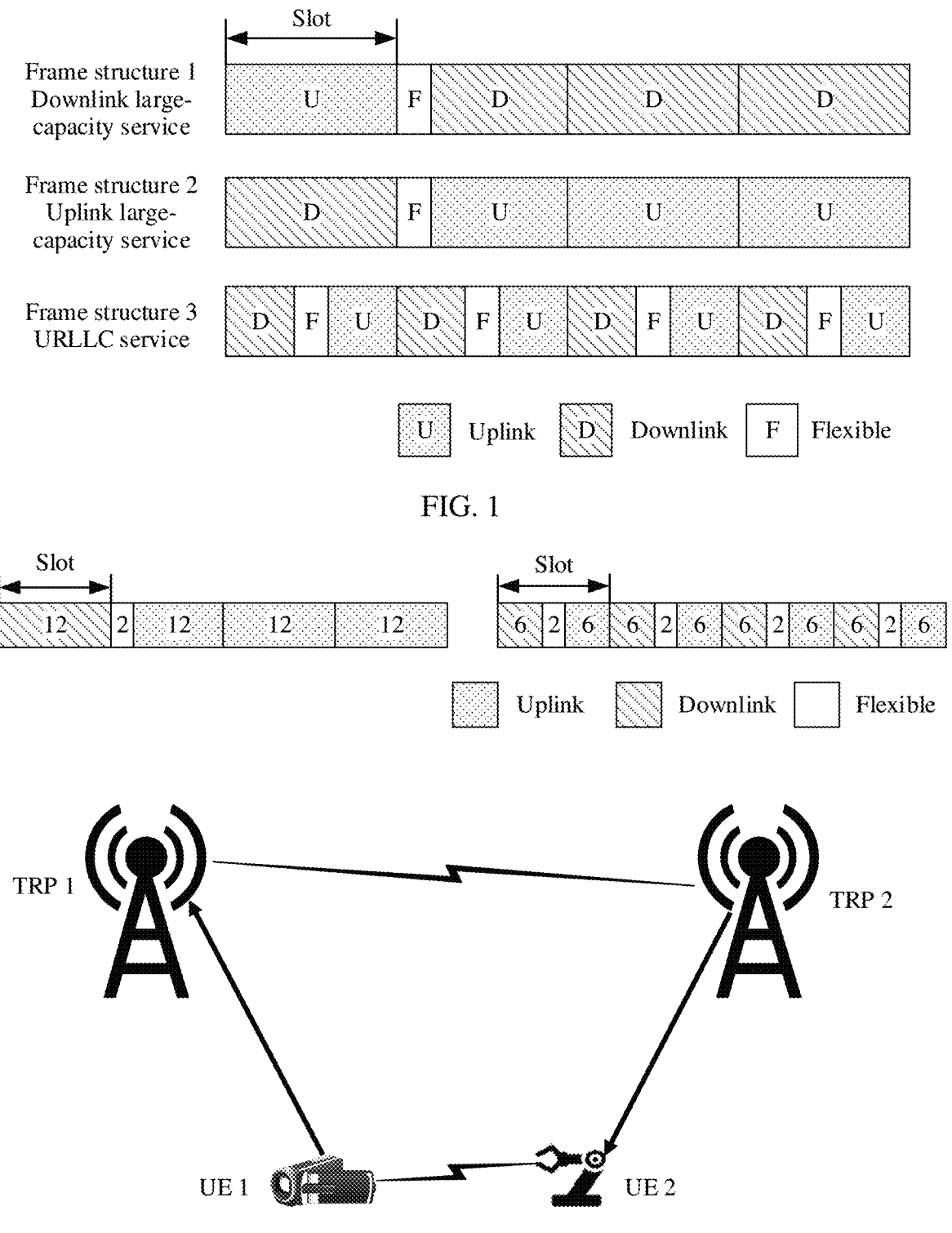
FIG. 1 is a schematic diagram of several possible frame structures.
FIG. 2 is a schematic diagram of a scenario in which contradirectional interference exists between devices supporting different services.
Figure 7:
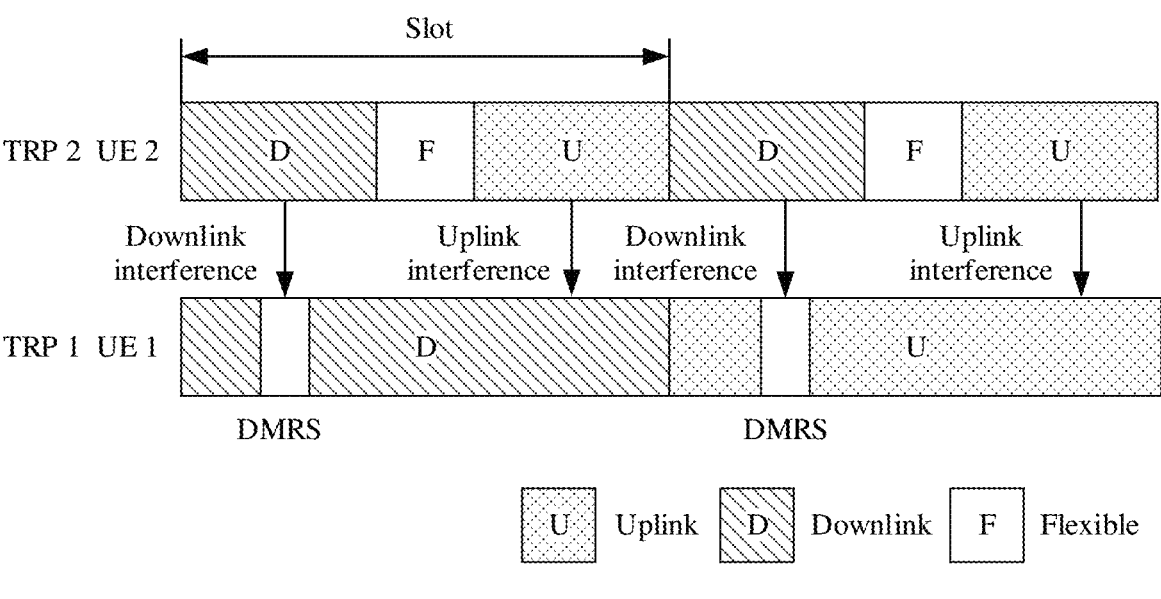
FIG. 7 is a schematic diagram of a scenario in which a terminal device suffers codirectional interference and contradirectional interference in one slot according to at least one embodiment of this application.

As shown in FIG. 7, a TRP 1 and UE 1 support an uplink large-capacity service, and use the frame structure 2 shown in FIG. 1; and a TRP 2 and UE 2 support a URLLC service, and use the frame structure 3 shown in FIG. 1. It can be learned based on service features of the UE 1 and the UE 2 and with reference to the frame structures 2 and 3 that data transmission of the UE 1 is slot-based. For one slot in the frame structure 2, a transmission direction of the slot is single, to be specific, the slot is either an uplink slot or a downlink slot, or symbols in the slot other than a flexible symbol (used for uplink/downlink conversion) is only uplink symbols or downlink symbols, and do not include both an uplink symbol and a downlink symbol. However, due to a low-latency requirement of the URLLC service, data transmission of the UE 2 is sub-slot based or half-slot based. One slot in the frame structure 3 has two transmission directions, to be specific, the slot includes both an uplink symbol and a downlink symbol.

Therefore, when time-frequency resources used by the UE 1 and the UE 2 overlap, in each slot in an overlapping area, because a transmission direction of the UE 2 changes, a direction of interference caused by the UE 2 to the UE 1 also changes accordingly. The UE 1 may sequentially experience codirectional interference and contradirectional interference in one slot. An interference channel obtained by the UE 1 through measurement based on a previous DMRS is different from a subsequent interference channel. The UE 1 performs interference zero-forcing based on the interference channel, and interference caused by the UE 2 to the UE 1 cannot be completely eliminated.

In view of this, at least one embodiment of this application provides another interference control method for a problem that a terminal device experiences interference in different transmission directions in one time unit.

FIG. 8 is a schematic flowchart of another interference control method according to at least one embodiment of this application. The method includes the following steps.

Step S801: A first network device sends third indication information to a first terminal device, where the third indication information indicates N time domain intervals included in a first time unit, each of the N time domain intervals includes one or more consecutive symbols in time domain, different time domain intervals do not overlap each other in time domain, and N is a positive integer greater than or equal to 2. The symbol in at least one embodiment of this application may be an orthogonal frequency division multiplexing (OFDM) symbol or a single-carrier frequency division multiplexing (SC-FDM) symbol.

Correspondingly, the first terminal device may receive the third indication information from the first network device.

In at least one embodiment of this application, the first network device is a serving network device of the first terminal device, or may be referred to as a serving base station or a serving node. To be specific, the first terminal device accesses the first network device, and the first network device provides control and data services for the first terminal device.

The first time unit is a slot, a subframe, or a radio frame, or may be another time scheduling unit. This is not limited in this application.

Interference signals received by the first terminal device are different in different time domain intervals of the N time domain intervals. Therefore, the N time domain intervals may also be considered as N interference intervals in the first time unit. Specifically, that the interference signals are different may refer to one or more of different strengths of the interference signals, different directions of the interference signals, or different autocorrelation matrices of the interference signals. Therefore, the first terminal device needs to measure the interference signal in each of the N time domain intervals, and correspondingly perform interference zero-forcing processing, but cannot perform interference smoothing across the time domain intervals.

The first indication information may be sent by the network device by using higher layer signaling or physical layer signaling. This is not limited in this application.

Step S802: The first network device sends downlink data to the first terminal device in the N time domain intervals.

The downlink data may be carried on a PDSCH.

Step S803: The first terminal device determines an interference autocorrelation matrix based on a reference signal and/or a data signal received in a first time domain interval, where the first time domain interval is one of the N time domain intervals.

Step S804: The first terminal device receives the downlink data from the first network device in the first time domain interval based on the interference autocorrelation matrix.

It should be noted that, in at least one embodiment of this application, the first time domain interval in the N time domain intervals is used as an example to describe a downlink data receiving process of the first terminal device. In consideration of a case in which the first time unit includes the N time domain intervals, and interference to the first terminal device in the N time domain intervals is different, the first terminal device needs to independently measure an interference channel in each time domain interval in the first time unit, and correspondingly perform interference zero-forcing processing on the interference channel in each time domain interval. In other words, the first terminal device may separately perform the processing described in step S803 and step S804 for each of the N time domain intervals.

It can be learned that, in at least one embodiment of this application, when an adjacent node of the first terminal device uses a sub-slot-level DL-UL configuration, the receiving of the downlink data by the first terminal device is subject to, in one slot, codirectional interference caused by downlink transmission from the adjacent node and contradirectional interference caused by uplink transmission from the adjacent node. The adjacent node may be a terminal device, a network device, or a device of another type. This is not limited in this application.

In this case, the first network device may indicate the N time domain intervals included in the first time unit to the first terminal device. The N time domain intervals may be determined based on the DL-UL configuration of the adjacent node, or may be understood as that the third indication information is interference interval information of the adjacent node in the first time unit. In this way, the first terminal device may be enabled to separately measure interference in different time domain intervals in the first time unit, to obtain accurate interference information, and better perform multi-antenna equalized receiving.

For example, the first time unit is one slot, and the slot includes two time domain intervals, which are respectively referred to as a first time domain interval and a second time domain interval. The slot includes 14 symbols in total, the first time domain interval includes the first seven symbols in the slot, and the second time domain interval includes the last seven symbols in the slot.

It is assumed that a PDSCH scheduled by a TRP 1 for UE 1 occupies the slot. As shown in FIG. 9A, if the PDSCH has DMRSs sent by the TRP 1 to the UE 1 in both the first time domain interval and the second time domain interval, the UE 1 may perform channel estimation and interference measurement based on a DMRS 1 in the first time domain interval (to be specific, the first seven symbols of the slot), obtain an estimated channel and a first interference autocorrelation matrix, and then perform multi-antenna equalized receiving of downlink data on the first seven symbols based on the first interference autocorrelation matrix. Similarly, the UE 1 may perform channel estimation and interference measurement based on a DMRS 2 in the second time-domain interval (namely, the last seven symbols of the slot), obtain an estimated channel and a second interference autocorrelation matrix, and then perform multi-antenna equalized receiving of downlink data on the last seven symbols based on the second interference autocorrelation matrix. It may be understood that the first interference autocorrelation matrix is determined based on the DMRS 1 in the first time domain interval, and is irrelevant to the DMRS 2 in the second time domain interval, and vice versa.

Figure 9B:
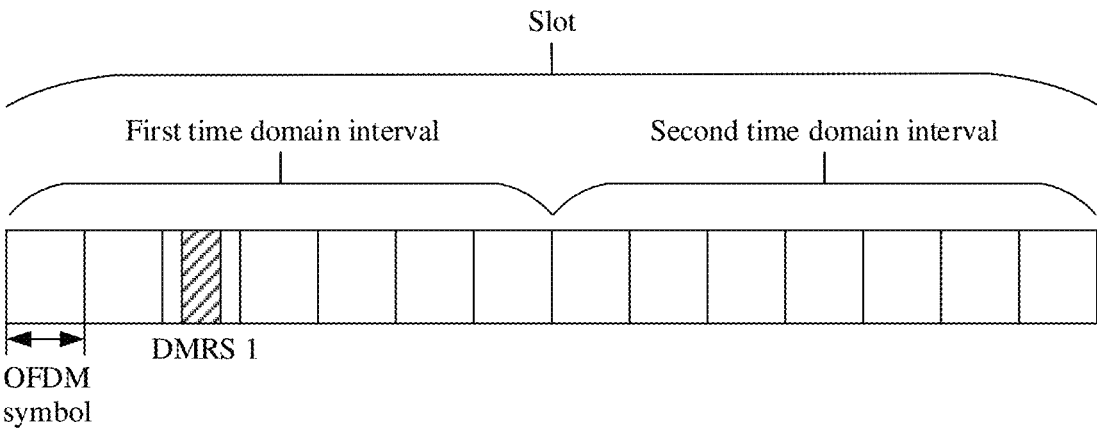

As shown in FIG. 9B, if there is a DMRS on the PDSCH only in the first time domain interval, the UE 1 may perform channel estimation and interference measurement based on a DMRS 1 in the first time domain interval (to be specific, the first seven symbols of the slot), obtain an estimated channel and a first interference autocorrelation matrix, and then perform multi-antenna equalized receiving of downlink data on the first seven symbols based on the first interference autocorrelation matrix. For the second time domain interval (namely, the last seven symbols of the slot), the UE 1 may perform joint processing of channel estimation, interference measurement, and data receiving based on a signal received in the second time domain interval. It should be noted that the joint processing is independent of the first interference autocorrelation matrix.

Figure 10:
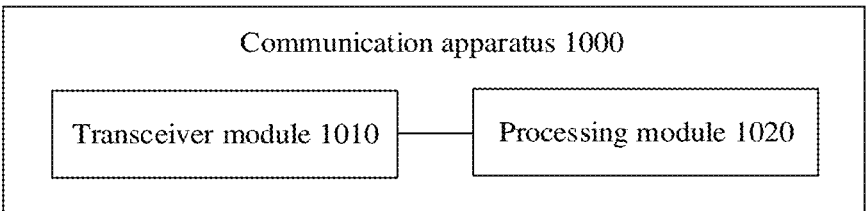
FIG. 10 is a schematic diagram of a structure of a communication apparatus according to at least one embodiment of this application.

At least one embodiment of this application further provides a communication apparatus. FIG. 10 is a schematic diagram of a structure of a communication apparatus according to at least one embodiment of this application. The communication apparatus 1000 includes a transceiver module 1010 and a processing module 1020. The communication apparatus may be configured to implement a function of the terminal device (for example, the first terminal device) in any one of the foregoing method embodiments. For example, the communication apparatus may be a terminal device, or may be a chip included in the terminal device, or may be an apparatus including the terminal device, for example, various types of vehicles.

For example, when the communication apparatus is used as a first terminal device to perform one or more method embodiments discussed with respect to FIG. 4, the transceiver module 1010 is configured to receive first indication information from a first network device, where the first indication information indicates a first reference signal RS. The processing module 1020 is configured to: obtain, based on measurement on the first RS, first interference information corresponding to the first RS; and determine a first transmission parameter based on the first interference information. The transceiver module 1010 is further configured to send uplink information to the first network device on a first time-frequency resource based on the first transmission parameter.

When the communication apparatus is used as a first terminal device to perform one or more method embodiments discussed with respect to FIG. 8, the transceiver module 1010 is configured to receive third indication information from a first network device, where the third indication information indicates N time domain intervals included in a first time unit, each of the N time domain intervals includes one or more consecutive symbols in time domain, different time domain intervals do not overlap each other in time domain, and N is a positive integer greater than or equal to 2. The processing module 1020 is configured to determine an interference autocorrelation matrix based on a reference signal and/or a data signal received in a first time domain interval, where the first time domain interval is one of the N time domain intervals. The transceiver module 1010 is further configured to receive downlink data from the first network device in the first time domain interval based on the interference autocorrelation matrix.

The processing module 1020 in the communication apparatus may be implemented by a processor or a processor-related circuit component, and the transceiver module 1010 may be implemented by a transceiver or a transceiver-related circuit component. An operation and/or a function of each module in the communication apparatus is used to implement a corresponding procedure of the method shown in FIG. 4, FIG. 5, FIG. 8, FIG. 9A, or FIG. 9B. For brevity, details are not described herein again.

Figure 11:
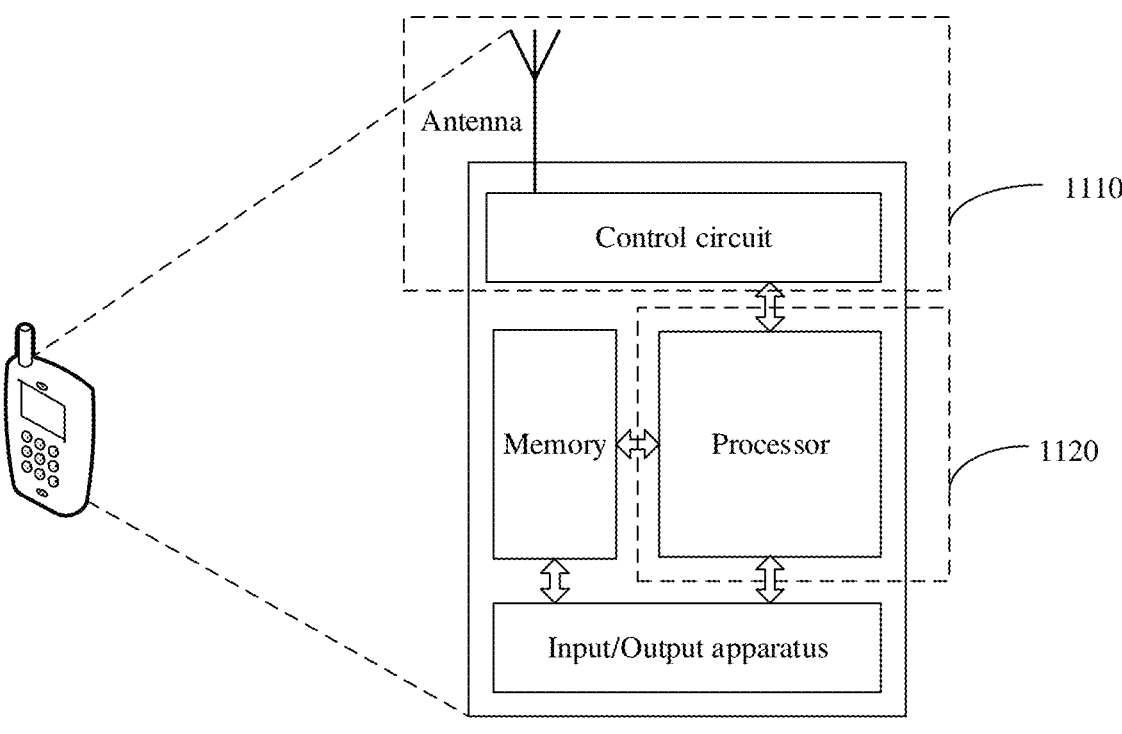
FIG. 11 is a schematic diagram of another structure of a communication apparatus according to at least one embodiment of this application.

FIG. 11 is a schematic diagram of another structure of a communication apparatus according to at least one embodiment of this application. The communication apparatus may be specifically a terminal device. For ease of understanding and illustration, in FIG. 11, a mobile phone is used as an example of the terminal device. As shown in FIG. 11, the terminal device includes a processor, may include a memory, and certainly, may further include a radio frequency circuit, an antenna, an input/output apparatus, and the like. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to send and receive radio frequency signals in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In at least one embodiment of this application, the antenna and a radio frequency circuit that have a transceiver function may be considered as a transceiver unit of the terminal device, and a processor that has a processing function may be considered as a processing unit of the terminal device. As shown in FIG. 11, the terminal device includes a transceiver unit 1110 and a processing unit 1120. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. That is, the transceiver unit 1110 includes the receiving unit and the sending unit. The transceiver unit sometimes may also be referred to as a transceiver circuit. The receiving unit may sometimes be referred to as a receiver machine, a receiver, a receiver circuit, or the like. The sending unit sometimes may also be referred to as a transmitter machine, a transmitter, a transmit circuit, or the like. It should be understood that the transceiver unit 1110 is configured to perform a sending operation and a receiving operation on the terminal device side in the foregoing method embodiments, and the processing unit 1120 is configured to perform an operation other than the sending operation and the receiving operation of the terminal device in the foregoing method embodiments.

Figure 12:
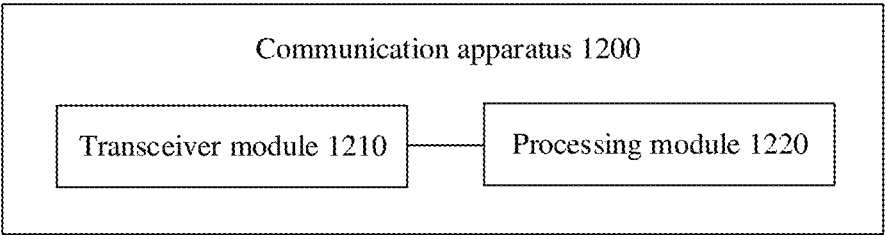
FIG. 12 is a schematic diagram of a structure of another communication apparatus according to at least one embodiment of this application.

At least one embodiment of this application further provides another communication apparatus. FIG. 12 is a schematic diagram of a structure of a communication apparatus according to at least one embodiment of this application. The communication apparatus 1200 includes a transceiver module 1210 and a processing module 1220. The communication apparatus may be configured to implement a function of the network device (for example, the first network device) in any one of the foregoing method embodiments. For example, the communication apparatus may be the first network device, or may be a chip included in the first network device.

For example, when the communication apparatus is used as a first network device to perform one or more method embodiments discussed with respect to FIG. 4, the processing module 1220 is configured to generate first indication information, where the first indication information indicates a first reference signal RS, and the first RS is an RS corresponding to a second terminal device that performs signal transmission on a first time-frequency resource. The transceiver module 1210 is configured to: send the first indication information to a first terminal device, and receive uplink information from the first terminal device on the first time-frequency resource.

When the communication apparatus is used as a first network device to perform one or more method embodiments discussed with respect to FIG. 8, the processing module 1220 is configured to generate third indication information, where the third indication information indicates N time domain intervals included in a first time unit, each of the N time domain intervals includes one or more consecutive symbols in time domain, different time domain intervals do not overlap each other in time domain, and N is a positive integer greater than or equal to 2. The transceiver module 1210 is configured to send downlink data to a first terminal device in the N time domain intervals.

It should be understood that the processing module 1220 in the communication apparatus may be implemented by a processor or a processor-related circuit component, and the transceiver module 1210 may be implemented by a transceiver or a transceiver-related circuit component. An operation and/or a function of each module in the communication apparatus is used to implement a corresponding procedure of the method shown in FIG. 4, FIG. 5, FIG. 8, FIG. 9A, or FIG. 9B. For brevity, details are not described herein again.

Figure 13:
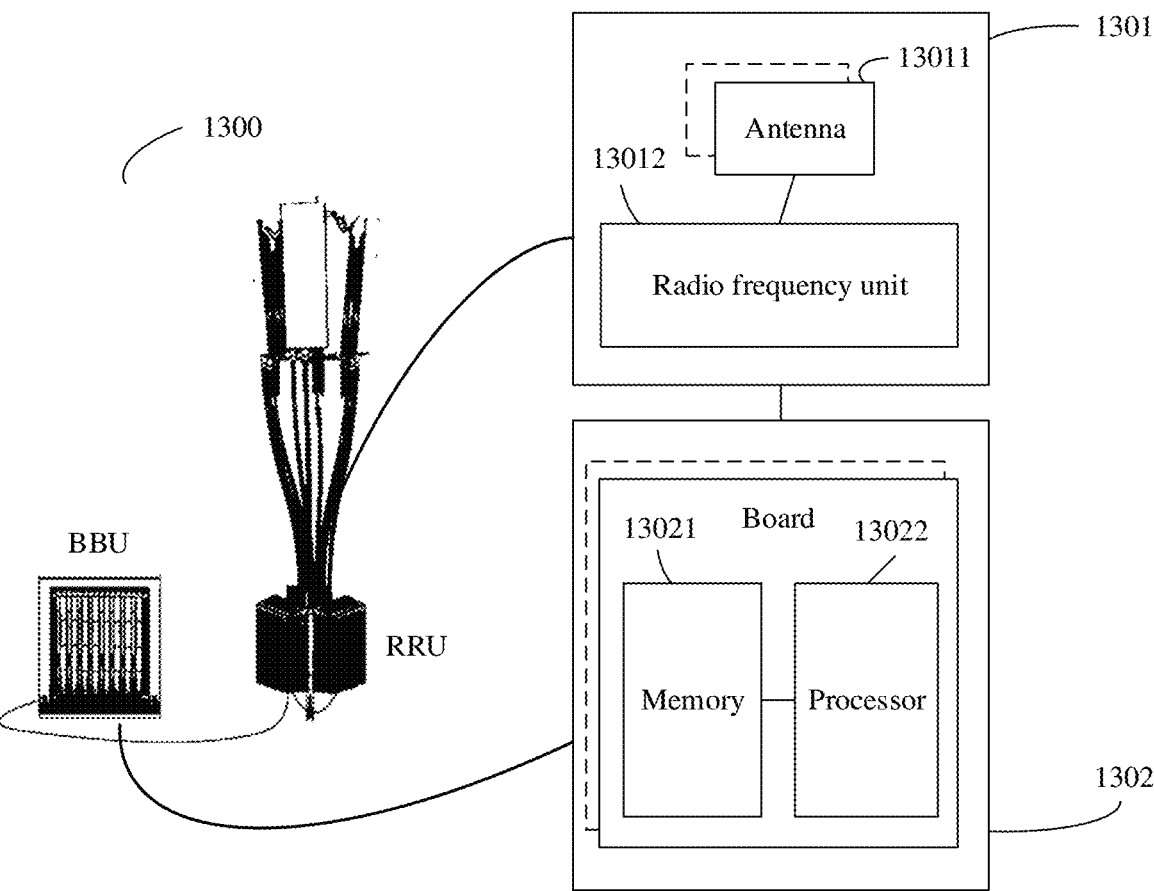
FIG. 13 is a schematic diagram of another structure of another communication apparatus according to at least one embodiment of this application.

FIG. 13 is a schematic diagram of another structure of a communication apparatus according to at least one embodiment of this application. The communication apparatus may be specifically a network device, for example, a base station, configured to implement a function of the first network device in any one of the foregoing method embodiments.

The network device includes one or more radio frequency units such as a remote radio unit (RRU) 1301 and one or more baseband units (BBUs) (which may also be referred to as one or more digital units (DUs)) 1302. The RRU 1301 may be referred to as a transceiver unit, a transceiver machine, a transceiver circuit, a transceiver, or the like, and may include at least one antenna 13011 and a radio frequency unit 13012. The RRU 1301 is mainly configured to: send and receive a radio frequency signal, and perform conversion between the radio frequency signal and a baseband signal. The BBU 1302 is mainly configured to: perform baseband processing, control the base station, and so on. The RRU 1301 and the BBU 1302 may be physically configured together, or may be physically configured separately, that is, in a distributed base station.

The BBU 1302 is a control center of the base station, may also be referred to as a processing unit, and is mainly configured to implement baseband processing functions such as channel coding, multiplexing, modulation, and spectrum spreading. For example, the BBU 1302 may be configured to control the base station to perform an operation procedure related to the network device in the foregoing method embodiments.

In an example, the BBU 1302 may include one or more boards. A plurality of boards may jointly support a radio access network (for example, an LTE network) of a single access standard, or may separately support radio access networks (such as an LTE network, a 5G network, or another network) of different access standards. The BBU 1302 may further include a memory 13021 and a processor 13022. The memory 13021 is configured to store necessary instructions and data. The processor 13022 is configured to control the base station to perform a necessary action, for example, is configured to control the base station to perform a sending operation in the foregoing method embodiments. The memory 13021 and the processor 14022 may serve one or more boards. In other words, a memory and a processor may be disposed on each board. Alternatively, a plurality of boards may share a same memory and a same processor. In addition, a necessary circuit may further be disposed on each board.

At least one embodiment of this application further provides a chip system, including a processor, where the processor is coupled to a memory. The memory is configured to store a program or instructions. When the program or the instructions are executed by the processor, the chip system is enabled to implement the method according to any one of the foregoing method embodiments.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated chip (application-specific integrated circuit, ASIC), a system on chip (SoC), a central processing unit (CPU), a network processor (NP), a digital signal processing circuit (DSP), a micro controller unit (MCU), a programmable logic device (PLD), or another integrated chip.

It should be understood that steps in the foregoing method embodiments may be implemented by using a logic circuit or instructions in a software form in the processor. The steps of the methods disclosed with reference to embodiments of this application may be directly performed by a hardware processor, or may be performed by a combination of hardware in the processor and a software module.

At least one embodiment of this application further provides a non-transitory computer-readable storage medium. The computer storage medium stores computer-readable instructions. When a computer reads and executes the computer-readable instructions, the computer is enabled to perform the method according to any one of the foregoing method embodiments.

At least one embodiment of this application further provides a computer program product. When a computer reads and executes the computer program product, the computer is enabled to perform the method in any one of the foregoing method embodiments.

At least one embodiment of this application further provides a communication system. The communication system includes a network device and at least one terminal device.

It should be understood that, the processor in embodiments of this application may be a CPU, or may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor, or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example, and not limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that numbers in various embodiments of this application are merely used for differentiation for ease of description. Sequence numbers of the foregoing processes do not mean execution sequences. The execution sequences of the processes are to be determined based on functions and internal logic of the processes, and should not be construed as any limitation on the implementation processes of embodiments of the instant application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one place, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a non-transitory computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory, a random access memory, a magnetic disk, or an optical disc.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

What is claimed is:

1. A communication apparatus, comprising:
at least one processor; and
a non-transitory computer readable medium storing a program comprising instructions executable by the at least one processor for causing the communication apparatus to perform:
receiving first indication information from a first network device, wherein
the first indication information indicates a first reference signal (RS),
the first RS corresponds to a second terminal device performing signal transmission with a second network device on a first time-frequency resource which is allocated by the first network device to the communication apparatus for uplink transmission, and
that the second terminal device performs signal transmission with the second network device on the same first time-frequency resource allocated to the first terminal device is determined by the first network device based on resource allocation information of the second network device;
obtaining, based on measurement on the first RS, first interference information corresponding to the first RS;
determining a first transmission parameter based on the first interference information to avoid interference with the signal transmission between the second terminal device and the second network device on the first time-frequency resource; and
sending uplink information to the first network device on the first time-frequency resource based on the first transmission parameter.

2. The communication apparatus according to claim 1, wherein
the first transmission parameter comprises a first precoding matrix,
a projection of the first precoding matrix in a first subspace is 0, the first subspace is a subspace comprising L strongest characteristic directions in a first interference channel matrix determined by using the first interference information, and
L is a positive integer.

3. The communication apparatus according to claim 2, wherein
L is equal to a quantity of eigenvalues whose values are greater than or equal to a first threshold among all eigenvalues of a first interference channel corresponding to the first interference channel matrix; or
L is equal to 1, 2, S/2, or S–R, wherein
S is a quantity of transceiver antennas of the communication apparatus which is a first terminal device, and
R is a quantity of data layers the first terminal device is configured to use to send the uplink information.

4. The communication apparatus according to claim 1, wherein the program comprises further instructions executable by the at least one processor for causing the communication apparatus to perform:
receiving first configuration information from the first network device, wherein the first configuration information indicates M RSs, the first RS is one of the M RSs, and M is a positive integer; and
measuring at least one RS of the M RSs, to obtain an interference channel corresponding to each of the at least one RS.

5. The communication apparatus according to claim 4, wherein
the first configuration information further indicates a time-frequency resource on which the first RS is located and a sending sequence of the first RS.

6. The communication apparatus according to claim 1, wherein
the first RS is a sounding reference signal (SRS) or a channel state information-reference signal (CSI-RS).

7. A method, comprising:
allocating, by a first network device, a first time-frequency resource to a first terminal device for uplink transmission;
obtaining, by the first network device, resource allocation information of a second network device;
determining, by the first network device and based on the resource allocation information of the second network device, a second terminal device performing signal transmission with the second network device on the first time-frequency resource which is allocated by the first network device to the first terminal device;
sending, by the first network device, first indication information to the first terminal device, wherein
the first indication information indicates a first reference signal (RS) corresponding to the second terminal device; and
receiving, by the first network device, uplink information from the first terminal device sent on the first time-frequency resource and based on a first transmission parameter, wherein the first transmission parameter is determined, based on measurement of the first RS, to avoid interference with the signal transmission between the second terminal device and the second network device on the first time-frequency resource.

8. The method according to claim 7, wherein the method further comprises:

determining, by the first network device, the first RS based on an identifier of the second terminal device, wherein the first RS is associated with the second terminal device.

9. The method according to claim 7, wherein the method further comprises:

sending, by the first network device, first configuration information to the first terminal device, wherein the first configuration information indicates M RSs, the first RS is one of the M RSs, and M is a positive integer.

10. The method according to claim 9, wherein the first configuration information further indicates a time-frequency resource on which the first RS is located and a sending sequence of the first RS.

11. The method according to claim 7, wherein the first RS is a sounding reference signal (SRS) or a channel state information-reference signal (CSI-RS).

12. A communication apparatus, comprising:

at least one processor; and a non-transitory computer readable medium storing a program comprising instructions executable by the at least one processor for causing the communication apparatus to perform:

allocating a first time-frequency resource to a first terminal device for uplink transmission;

obtaining resource allocation information of a second network device;

determining, based on the resource allocation information of the second network device, a second terminal device performing signal transmission with the second network device on the first time-frequency resource which is allocated by the first network device to the first terminal device;

sending first indication information to the first terminal device, wherein the first indication information indicates a first reference signal (RS) corresponding to the second terminal device; and receiving uplink information from the first terminal device sent on the first time-frequency resource and based on a first transmission parameter, wherein the first transmission parameter is determined, based on measurement of the first RS, to avoid interference with the signal transmission between the second terminal device and the second network device on the first time-frequency resource.

13. The communication apparatus according to claim 12, wherein the program comprises further instructions executable by the at least one processor for causing the communication apparatus to perform:

determining the first RS based on an identifier of the second terminal device, wherein the first RS is associated with the second terminal device.

14. The communication apparatus according to claim 12, wherein the program comprises further instructions executable by the at least one processor for causing the communication apparatus to perform:

sending first configuration information to the first terminal device, wherein the first configuration information indicates M RSs, the first RS is one of the M RSs, and M is a positive integer.

15. The communication apparatus according to claim 14, wherein the first configuration information further indicates a time-frequency resource on which the first RS is located and a sending sequence of the first RS.

16. The communication apparatus according to claim 12, wherein the first RS is a sounding reference signal (SRS) or a channel state information-reference signal (CSI-RS).

* * * * *